United States Patent [19]

Converse

[11] Patent Number: 4,653,141
[45] Date of Patent: Mar. 31, 1987

[54] DAMPER HINGE CONSTRUCTION HAVING PROGRESSIVELY INCREASED DAMPENING DURING CLOSED POSITION APPROACH

[76] Inventor: Nelson Converse, 8736½ Belford Ave., Los Angeles, Calif. 90045

[21] Appl. No.: 909,298

[22] Filed: Sep. 19, 1986

[51] Int. Cl.⁴ ............................................. E05F 5/02
[52] U.S. Cl. ...................................... 16/82; 188/306
[58] Field of Search ................... 16/82, 84; 188/284, 188/306

[56] References Cited

U.S. PATENT DOCUMENTS

| | | | |
|---|---|---|---|
| 1,815,003 | 7/1931 | Beecher | 188/306 |
| 3,613,842 | 10/1971 | Buciak | 188/306 |
| 3,672,475 | 6/1972 | Nash | 188/306 |

Primary Examiner—Fred Silverberg
Attorney, Agent, or Firm—George E. Schick

[57] ABSTRACT

A single or opposite direction damper hinge has a casing rotatably enclosing a rotor. The rotor has a center cylindrical portion mounting a reduced outwardly projecting intermediate portion which in turn outwardly mounts a further reduced stop portion. The casing has a main inner cylindrical surface which is interrupted by an inwardly projecting reduced engagement portion. In one embodiment, all of the rotor center, intermediate and stop portions and the casing main inner surface are coaxial. The casing reduced engagement portion, however, has a larger radius than the outwardly projecting intermediate portion of the rotor and is eccentric to the rotor outer surfaces and the casing main inner cylindrical surface. In assembly for operation, the rotor is mounted coaxially in the casing with the exception of the casing engagement portion which, in this embodiment, has the larger radius and is eccentric to the rotor intermediate portion. The rotor intermediate portion radially faces the casing engagement portion with the surfaces progressively closing due to the casing engagement portion larger radius and eccentricity, and the rotor stop portion interfering with the casing engagement portion ultimately abutting through facing steps. Further, the rotor and casing, in a second form, may be somewhat reversed, that is, the rotor having a smaller radius and eccentricity on the mating surface and the casing having the concentric mating surface, the overall result being the same. Finally, if the hinge is operable in opposite clockwise or counterclockwise directions, both of the casing and rotor are formed symmetrically with diametrically opposite and closed positions, and operable the same in either direction.

14 Claims, 9 Drawing Figures

DAMPER HINGE CONSTRUCTION HAVING PROGRESSIVELY INCREASED DAMPENING DURING CLOSED POSITION APPROACH

This application contains some subject matter similar to Ser. No. 747,294, filed June 21, 1985, now abandoned.

BACKGROUND OF THE INVENTION

This invention relates to a damper hinge construction and, more particularly, to a damper hinge construction which may be formed operable in a single direction or identically in opposite directions. Even more specifically, the present invention involves various improvements which, when operable in concert, provide a vastly superior damper hinge form. Due to specific formations, the hinge is slowed in movement or dampened by approaching part surfaces and is stopped by part stepped interfering surfaces, all while the main hinge movement is guided through preferably closely joined abutted surfaces.

Various prior damper hinge constructions have heretofore been provided, none of which have satisfied the superior structure of the present invention. For instance, there are many prior hinge constructions which have included damper means thereon for retarding or slowing the hinge rotor movement, particularly approaching the closed position. Certain have been provided with short sections of approaching the closed position which gradually retard the movement of the gas or liquid around the rotor for ultimately slowing down and stopping the rotor, and there are even hinges which retard the gas or liquid movement from the beginning with progressively increasing force to even more greatly retard the overall rotor movement. However, none of the prior constructions have combined the various features of construction such that various features come into play on a combined basis.

OBJECTS AND SUMMARY OF THE INVENTION

It is, therefore, an object of this invention to provide damper hinge constructions which contains the combination of close surface guiding with a slowing or dampening arrangement and full stop arrangement. Each has its individual function, yet in a proper combination, the various features join for one to add to the other. In this matter, fully advantageous dampener hinge constructions are provided having all of the various features in proper form and use.

In certain forms thereof, a rotor is coaxially mounted movable in a casing with the rotor having a center portion effective for guiding the rotor during movement, an intermediate segmental portion for leading the rotor into the start and continuation of dampening, and an outer stop portion which ends the movement of the rotor. The casing has a main inwardly facing surface and an inwardly projecting, reduced engagement portion thereon, which cooperates with the various rotor elements for providing the rotor motion as stated. Thus, damper hinge constructions of these combined features are provided which cooperate to form superior damper hinge constructions not heretofore available.

It is a further object of this invention to provide damper hinge constructions having all of the foregoing features and use, yet which preferably also includes an arrangement of the casing and rotor in symmetrical form so that the rotor is movable either clockwise or counterclockwise from a middle start position. Thus, the same hinge results are produced, but in exactly the opposite manner. All of the rotor portions are opposite ended circumferentially, that is, the reduced intermediate segmental portion has double ends and double, outwardly facing, coaxial surfaces, and the further reduced outer stop portion has opposite stop surfaces at either end of the outer surface. The casing reduced engagement portion likewise has oppositely circumferentially facing stop surfaces with inward symmetrical surfaces acting against the rotor intermediate portion and in both directions. Thus, the damper hinge constructions are operable in either direction and the same results will occur, only in the opposite direction.

It is still a further object of this invention to provide damper hinge constructions having all of the foregoing features and use, at least in a single direction, and preferably in opposite directions, while still preferably having either one or both of particular shaft constructions for maximum proper use over a long period of useful life. For instance, the constructions might include a stub center shaft on the casing which mounts the rotor for the damper hinge movement, or a further shaft may be mounted on the rotor projecting centrally from the casing and engageable exterior of the casing. Furthermore, both shafts may be provided, each acting in its individual use and free of interference with the other. Again, damper hinge constructions are provided with many combined features which are far superior over the prior constructions.

Other objects and advantages of the invention will be apparent from the following specification and the accompanying drawings which are for the purpose of illustration only.

DESCRIPTION OF THE BEST EMBODIMENT CONTEMPLATED

Figure 1:
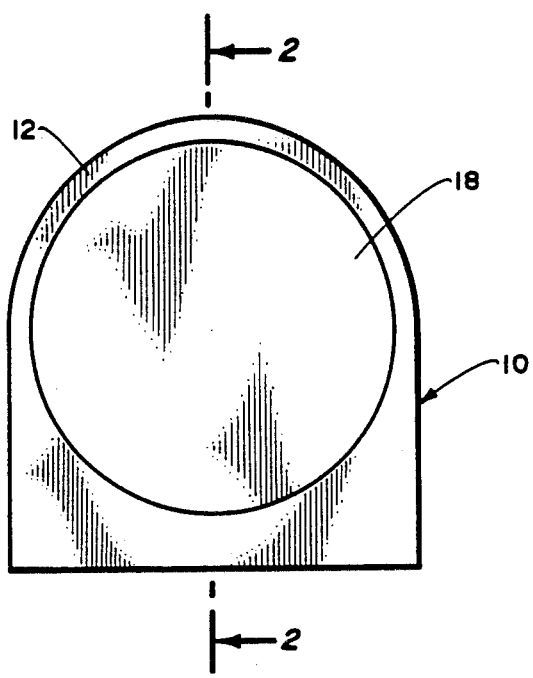
FIG. 1 is a front elevational view of a damper hinge construction incorporating the inventive features of a first embodiment of the present invention.
Figure 2:
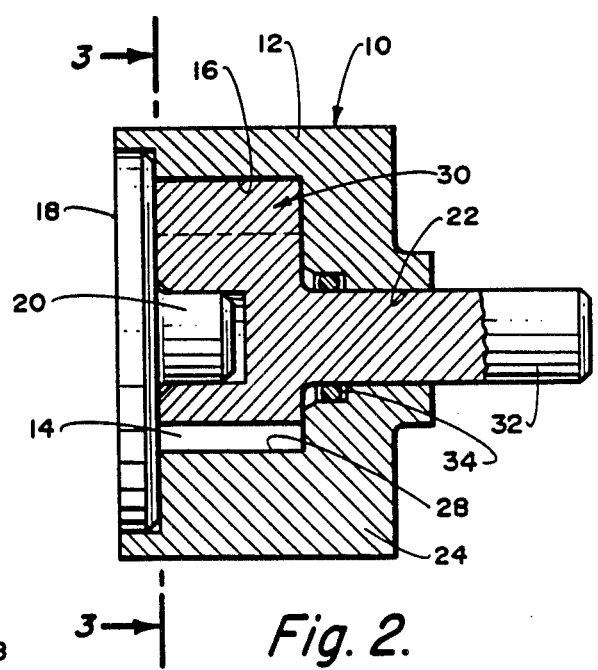
FIG. 2 is a vertical section with certain parts in elevation looking in the direction of the arrows 2—2 in FIG. 1, the damper hinge construction being shown in open or null position.

Referring to the drawings, a first embodiment damper hinge construction is shown in FIGS. 1 through 5 incorporating the principles of the present invention. The illustration of damper hinge construction shown here is of the dual construction form wherein the hinge construction may be moved in either clockwise or counterclockwise directions of rotation and will move between fully opened or null and fully closed positions in either of these directions of rotation. It is pointed out, however, that a single direction of rotation for the damper hinge construction may be provided, that is, either clockwise or counterclockwise directions of rotation without the other form, all dependent on the requirements of the installation and use. Furthermore, regardless of formation, both this first embodiment form and the second embodiment form of the damper hinge construction of the present invention may be formed of usual materials and common sophisticated metals. Furthermore, usual internal fluids may be used such as air, gases or liquids, all again dependent upon the particular end use of the designated construction.

More specifically, the first embodiment form of the damper hinge construction of the dual form as shown includes a casing generally indicated at 10 having a main enclosure member 12 which basically forms the rotor opening 14 with the inwardly facing, main surface 16. As is clearly seen, the rotor opening 14 extends axially within the main enclosure member 12 between a removable face place 18 having a coaxial stub shaft 20 and an opposite, coaxial rotor shaft opening 22 projecting oppositely from the main enclosure member 12. Lower internally, the main enclosure member 12 is formed with an inwardly projecting, circumferentially reduced, engagement portion 24 extending inwardly from the rotor opening 14, the rotor opening otherwise being cylindrical. The engagement portion includes generally radially extending ends or steps 26 and an arcuate, inwardly facing surface 28 which is, in this particular first embodiment, formed by a radius larger than and eccentric to the radius of the intermediate segmental portion 38 of the rotor generally indicated at 30, and also eccentric to the radii of the other coaxial surfaces, the latter to be hereinafter described. Functionally, a somewhat opposite form may be employed, that is, the radius of the intermediate segmental portion 38 of the rotor 30 may have a smaller radius which is eccentric, and the casing inwardly facing surface 28 of the engagement portion 24 the concentric radius, and the same result will be produced, as will be hereinafter discussed more in detail.

A rotor generally indicated at 30 is positioned within the rotor opening 14 of the main enclosure member 12 received over the stub shaft 20 of the removable base plate 18. The rotor 30 opposite the removable face plate 18 has a coaxial center shaft 32 which projects axially through the casing rotor shaft opening 22 for access outwardly of the casing 10 and being sealed by an annular seal 34. Without yet identifying and describing the various rotor parts, it is seen that the rotor is freely rotative on the face plate stub shaft 20 and rotates the rotor center shaft 32, in either direction.

The main portion of the rotor 30 includes a coaxial, cylindrical center portion 36 which encompasses the face plate stub shaft 20. Formed on this center portion 36 is a circumferentially reduced, intermediate segmental portion 38 which is about one third the circumferential length of the center portion 36 and has opposite, generally radial, end steps 40 and, in this first embodiment, a coaxial, outer circumferential surface 42. Finally, positioned on the intermediate segmental portion 38 is a further circumferentially reduced, outer stop portion 44 circumferentially centered on the intermediate segmental portion forming about one third thereof or one ninth of the rotor 30, and also, having generally radial, opposite end steps 46 forming termination of an outer circumferential surface 48.

In assembly, of the first embodiment, with the rotor 30 mounted on the face plate stub shaft 20 and inserted in the casing main enclosure member 12 projecting the rotor center shaft 32 outwardly through the rotor shaft opening 22, the rotor center portion 36 is at all times radially spaced from the inwardly facing main surface 16 and the inwardly projecting engagement portion 24 of the casing main enclosure member 12. The rotor intermediate segmental portion 38 is just radially inward of the inwardly projecting engagement portion 24 when the rotor 30 moves circumferentially to this location, and due to the difference in radius of the rotor intermediate segmental portion 38 which, in this case, is coaxial and the inwardly projecting engagement portion 24 which, in this case, is of larger radius and eccentric, these surfaces can nearly come into engagement near one of the end steps 40 of the rotor intermediate segmental portion 38, as will be hereinafter described more in detail. The outer stop portion 44 has its outer circumferential surface 48 closely movable along the inwardly facing main surface 16 in either direction to the casing inwardly projecting engagement portion 24, with the end steps 46 of the outer stop portion coming into abutment in either direction with the engagement portion steps 26.

Figure 3:
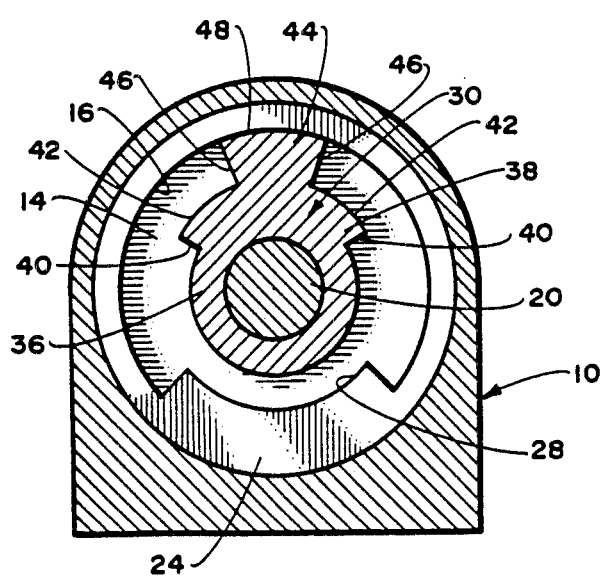
FIG. 3 is a vertical sectional view looking in the direction of the arrows 3—3 in FIG. 2, the damper hinge construction still being in the open or null position.
Figure 4:
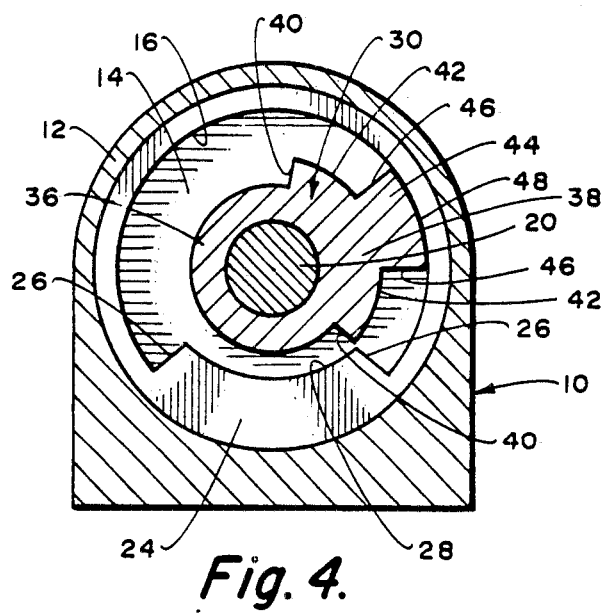
FIG. 4 is a view similar to FIG. 3 but with the damper hinge construction in a position about midway between open position and closed position.
Figure 5:
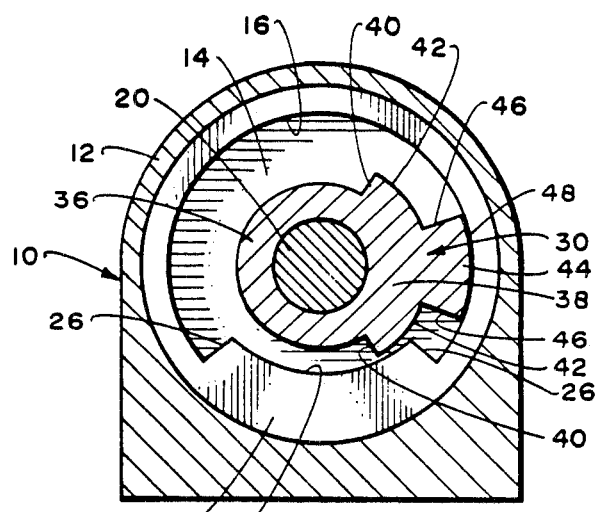
FIG. 5 is a view similar to FIGS. 3 and 4 but with the damper hinge construction in a position starting to move into damper closed position.
Figure 6:
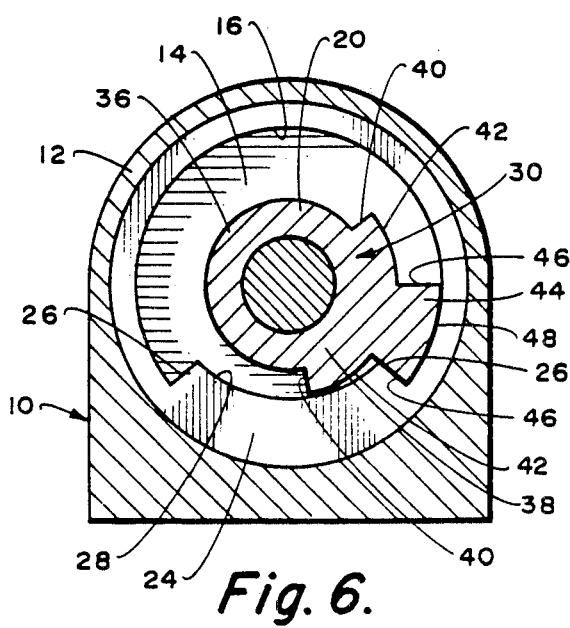
FIG. 6 is a view similar to FIGS. 3, 4 and 5, but in damped, fully closed position.

Starting from full open or null position of the first embodiment of the damper hinge construction as shown, and following through a cycle of movement to closed in the clockwise direction as shown in FIGS. 3 through 6, as seen in FIG. 3, the rotor 30 is positioned such that both the intermediate segmental portion 38 and the outer stop portion 44 both project upwardly halfway between the steps 26 of the inwardly projecting engagement portion 24 and fully spaced therefrom. In FIG. 4, the rotor 30 has rotated clockwise such that the end of the intermediate segmental portion 38 is just ready to begin to move into beginning registry with the inwardly projecting engagement portion 24 of the casing 10, but still spaced therefrom radially. The rotor outer stop portion 44 is spaced circumferentially away from the casing engagement portion 24. In FIG. 5, the rotor 30 has continued to rotate with the various positioning coming closer into registry, the rotor intermediate segmental portion 38 still radially slightly spaced from the casing engagement portion 24 and the rotor outer stop portion 44 approaching, but still spaced from the casing engagement portion 24. Finally, as shown in FIG. 6, the rotor 30 reaches fully stopped position moved totally clockwise, the rotor outer stop portion 44 having the appropriate one of the end steps 46 fully engaged with the engagement portion step 26 and the rotor intermediate segmental portion 38 either engaging or coming nearly into engagement with the casing engagement portion 24.

By following through the movement of the rotor 30 within the casing 10, it will be seen that from the upper start of FIG. 3 for an initial portion of movement, the rotor 30 will move relatively freely. This, of course, will be dependent on the particular atmosphere within the casing 10. Even here, if a relatively thickened oil or hydraulic fluid is used within the casing 10, the movement of the rotor will be fairly burdened. However, if a thin oil or hydraulic fluid is used, or air or a gas is used, the initial movement will remain relatively unburdened.

This will remain until the rotor 30 begins to reach the position shown in FIG. 4 where the rotor intermediate segmental portion 38 is coming into registry with the casing engagement portion 24, since the movement of fluid, whether gas or oil, will begin to be restricted by the casing engagement portion 24. As the rotor 30 moves from the position shown in FIG. 4 to the position shown in FIG. 5, the movement of fluid is restricted to a greater and greater extent, thereby creating the desired dampening effect. As the rotor 30 reaches the stop position shown in FIG. 6, wherein the rotor end step 46 of the outer stop portion 44 engages the casing engagement portion step 26, the movement of fluid must virtually cease depending on the differences in radii and the extension of the rotor outer circumferential surface 42 of the intermediate segmental portion 38, and the casing inwardly facing surface 28 of the casing engagement portion 24.

With the dual construction illustrated, in this first embodiment, movement of the rotor 30 from the fully open or null to the fully closed or stopped position in the opposite or counterclockwise direction would be virtually the same, just opposite. Furthermore, if it is desired to construct a damper hinge construction which is only of a single direction nature, the various steps and surfaces in the one direction can be eliminated and only those in the other direction provided. Furthermore, any of the damper hinge constructions of the present invention may be used for the various hinge uses either actionable in the horizontal or vertical positions, all well known to the skilled mechanics. Still further, the mounting of the rotor 30 on the stub shaft 20 of the removable face plate 18 and the projection of the rotor center shaft 32 through the casing for outward engagement are particular forms of inventive value, but it is clearly seen that other forms of shaft mountings and extensions may be used depending on the overall use of the particular damper hinge construction.

Figure 7:
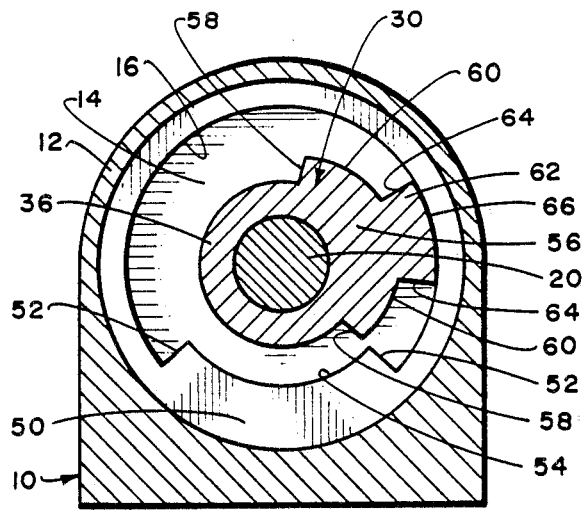
FIG. 7 is a view similar to FIG. 4 of a second embodiment of the present invention, a damper hinge construction in a position about midway between open position and closed position.
Figure 8:
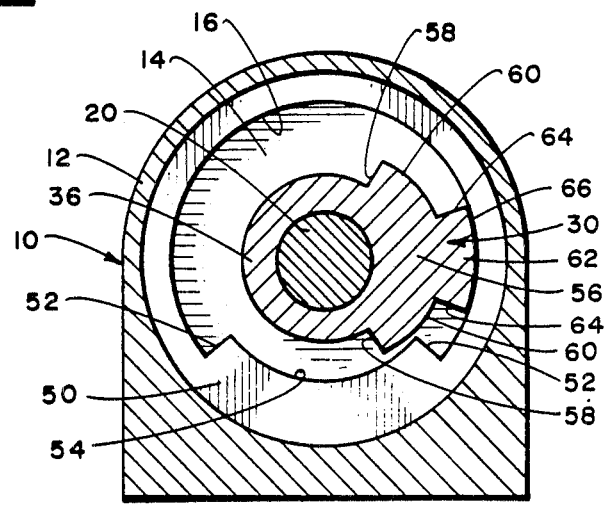
FIG. 8 is a view similar to FIG. 5, the second embodiment damper hinge construction being in a position starting to move into damped closed position.
Figure 9:
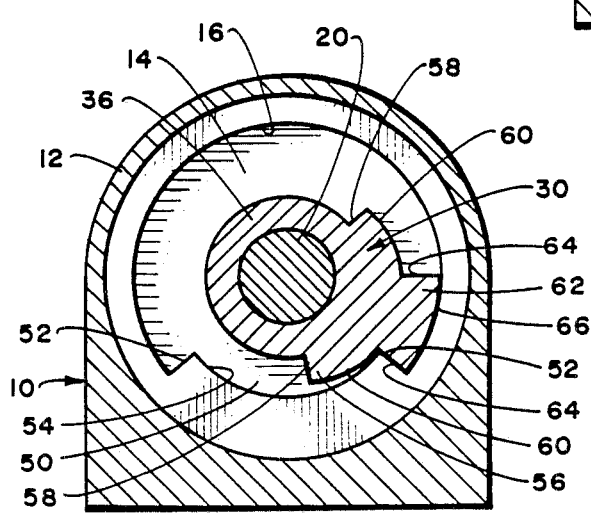
FIG. 9 is a view similar to FIGS. 7 and 8, but in damped, fully closed position.

Referring to FIGS. 7 through 9, a second embodiment of the damper hinge construction is illustrated and includes generally the same elements as the first embodiment of FIGS. 1 through 6 with the exception of a different inwardly projecting, engagement portion 50 replacing the first embodiment engagement portion 24, a different intermediate segmental portion 56 replacing the first embodiment intermediate segmental portion 38, and a slightly different outer stop portion 62 replacing the first embodiment outer stop portion 44. In the first embodiment, all parts of the rotor 30 including the outer circumferential surface 42 are concentric and the inwardly facing surface 28 of the engagement portion 24 is eccentric to provide the gradually approaching dampening surfaces. In the second embodiment, the surfaces may be said to be opposite or reversed, that is, all of the surfaces of the rotor 30 with the exception of the outer circumferential surface 60, but including the inwardly facing surface 54 of the engagement portion 50, are concentric and the outer circumferential surfaces 60 of the rotor 30 are eccentric to provide the gradually approaching dampening surfaces. Furthermore, it can be seen that the spacing between surfaces in both cases is gradually closed, even though the surfaces close from opposite ends, as seen for comparison in FIG. 6 as compared to FIG. 9.

Specifically referring to FIGS. 7, 8 and 9, in FIG. 7, the rotor 30 is intermediate its clockwise movement with the gradually closing surfaces just starting to come into registry, that is, the outer circumferential surface 60 of the rotor 30 just starting to come into registry with the inwardly facing surface 54 of the engagement portion 50. FIG. 8 shows partial registry of the surfaces and the minimum spacing therebetween being less. Finally, FIG. 9 shows complete telescoping or registry and virtually no spacing therebetween. Thus, just as in the first embodiment, in this second embodiment, the closing movement of the mating surfaces of the rotor 30 and the casing 10 provide a gradually dampened closing which increases in dampening intensity as complete closing is approached.

Although the principles of the present invention have been herein illustrated in the particular embodiments of damper hinge construction, it is not intended to limit such principles to those constructions alone, since the same principles are readily applicable to various other forms of damper hinge construction. Thus, the principles of the present invention should be broadly construed and not limited beyond the specific limitations set forth in the appended claims, including the patent equivilants thereof.

I claim:

1. In a damper hinge construction of the type having a casing with a rotor mounted coaxially movable therein between an open position and at least one damped closed position; the improvements including; said rotor having a center portion which is a generally coaxial cylindrical element with an intermediate segmental portion which is circumferentially reduced and formed radially outwardly thereon, a further circumferentially reduced outer stop portion formed radially outwardly on said intermediate portion, said intermediate portion having outer surface means and a generally radial step at least at one end projecting inwardly from said outer surface means to said center portion, said stop portion having an outer surface means and a generally radial step at least generally at said same one end, but spaced circumferentially inwardly therefrom and projecting inwardly from said stop portion outer surface means; said stop portion outer surface means being movable along a casing main inwardly facing surface means; said casing main surface means having an inwardly projecting and circumferentially reduced engagement portion with a generally radial step facing said rotor stop portion radial step and terminating in an inwardly facing surface means; one of said casing engagement portion surface means and said rotor intermediate portion surface means being eccentric to the other of said surface means and said other of said surface means being concentric to said rotor center portion, said rotor intermediate portion surface means when moving into radial alignment with said casing engagement portion surface means by said rotor intermediate portion ultimately moving progressively radially closer to said casing engagement portion surface means due to radius difference and eccentricity with said step of said rotor stop portion ultimately engaging said step of said casing engagement portion.

2. In a damper hinge construction as defined in claim 1 in which said step of said rotor stop portion always engages said step of said casing engagement portion either prior to or simultaneously with said outer surface means of said rotor intermediate portion so as to progressively move into any contact with said engagement portion surface means of said casing.

3. In a damper hinge construction as defined in claim 1 in which said rotor open position is diametrically opposite in said casing from said damped closed position, said main inwardly facing surface means of said casing and said inward projection engagement portion of said casing and said center portion of said rotor and said intermediate portion of said rotor and said outer stop portion of said rotor all being symmetrical when viewed from the axial direction, said outer surface means of said rotor intermediate portion ultimately progressively moving closely toward said surface means of said casing engagement portion when there is movement in either direction of clockwise or counterclockwise rotation and the step of said stop portion of said rotor always terminates said rotatable movement by engaging the step of said engagement portion of said casing.

4. In a damper hinge construction as defined in claim 1 in which said step of said rotor stop portion always engages said step of said casing engagement portion either prior to or simultaneously with said outer surface means of said rotor intermediate portion progressively moving into any contact with said engagement portion surface means of said casing; and in which said rotor open position is diametrically opposite in said casing from said damped closed position, said main inwardly facing surface means of said casing and said inwardly projecting engagement portion of said casing and said center portion of said rotor and said intermediate portion of said rotor and said outer stop portion of said rotor all are symmetrical when viewed from the axial direction, said outer surface means of said rotor intermediate portion ultimately progressively moving closely toward said surface means of said casing engagement portion when there is movement in either direction of clockwise or counterclockwise rotation and the step of said stop portion of said rotor always terminates said rotatable movement by engaging the step of said engagement portion of said casing.

5. In a damper hinger construction as defined in claim 1 in which said rotor is mounted coaxially movable with said casing by being mounted on a stub shaft of said casing.

6. In a damper hinge construction as defined in claim 1 in which said rotor has a center shaft projecting coaxially therefrom through said casing for engagement outward of said casing.

7. In a damper hinge construction as defined in claim 1 in which said rotor is mounted coaxially movable with said casing by being mounted on a stub shaft of said casing; and in which said rotor has a center shaft projecting coaxially therefrom through said casing for engagement outward of said casing, said rotor center shaft being spaced from and out of interference with said casing stub shaft.

8. In a damper hinge construction as defined in claim 1 in which said rotor open position is diametrically opposite in said casing from said damped closed position, said main inwardly facing surface means of said casing and said inwardly projecting engagement portion of said casing and said center portion of said rotor and said intermediate portion of said rotor and said outer stop portion of said rotor all are symmetrical when viewed from the axial direction, said outer surface means of said rotor intermediate portion ultimately progressively moving closely toward said surface means of said casing engagement portion when there is movement in either direction of clockwise or counterclockwise rotation and said step of said rotor stop portion always terminates said rotatable movement by engaging a step of said casing engagement portion; in which said rotor is mounted coaxially movable with said casing by being mounted on stub shaft of said casing; and in which said rotor has a center shaft projecting coaxially therefrom through said casing for engagement outward of said casing, said center shaft of said rotor being spaced from and out of interference with said stub of said casing.

9. In a damper hinge construction as defined in claim 1 in which said surface means of said rotor intermediate portion is eccentric to said surface means of said casing engagement portion and said surface means of said casing engagement portion is concentric to said rotor center portion.

10. In a damper hinge construction as defined in claim 1 in which said surface means of said casing engagement portion is eccentric to said surface means of said rotor intermediate portion and said surface means of said rotor intermediate portion is concentric to said rotor center portion.

11. In a damper hinge construction as defined in claim 1 in which said surface means of said rotor intermediate portion is eccentric to said surface means of said casing engagement portion and said surface means of said casing engagement portion is concentric to said rotor center portion; and in which said step of said rotor stop portion always engages said step of said casing engagement portion either prior to or simultaneously with said outer surface means of said rotor intermediate portion so as to progressively move into any contact with said engagement portion surface means of said casing.

12. In a damper hinge construction as defined in claim 1 in which said surface means of said casing engagement portion is eccentric to said surface means of said rotor intermediate portion and said surface means of said rotor intermediate portion is concentric to said rotor center portion; and in which said step of said rotor stop portion always engages said step of said casing engagement portion either prior to or simultaneously with said outer surface means of said rotor intermediate portion so as to progressively move into any contact with said engagement portion surface means of said casing.

13. In a damper hinge construction as defined in claim 1 in which said surface means of said rotor intermediate portion is eccentric to said surface means of said casing engagement portion and said surface means of said casing engagement portion is concentric to said rotor center portion; and in which said rotor open position is diametrically opposite in said casing from said damped closed position, said main inwardly facing surface means of said casing and said inward projection engagement portion of said casing and said center portion of said rotor and said intermediate portion of said rotor and said outer stop portion of said rotor all being symmetrical when viewed from the axial direction, said outer surface means of said rotor intermediate portion ultimately progressively moving closely toward said surface means of said casing engagement portion when there is movement in either direction of clockwise or counterclockwise rotation and the step of said stop portion of said rotor always terminates said rotatable movement by engaging the step of said engagement portion of said casing.

14. In a damper hinge construction as defined in claim 1 in which said surface means of said casing engagement portion is eccentric to said surface means of said rotor intermediate portion and said surface means of said rotor intermediate portion is concentric to said rotor center portion; and in which said rotor open position is diametrically opposite in said casing from said damped closed position, said main inwardly facing surface means of said casing and said inward projection engagement portion of said casing and said center portion of said rotor and said intermediate portion of said rotor and said outer stop portion of said rotor all being symmetrical when viewed from the axial direction, said outer surface means of said rotor intermediate portion ultimately progressively moving closely toward said surface means of said casing engagement portion when there is movement in either direction of clockwise or counterclockwise rotation and the step of said stop portion of said rotor always terminates said rotatable movement by engaging the step of said engagement portion of said casing.

* * * * *